United States Patent [19]

Kato et al.

[11] 4,051,078

[45] Sept. 27, 1977

[54] CHLORINATED ELASTOMER COMPOSITIONS

[75] Inventors: Hirosi Kato, Nishinomiya; Hideo Fujita, Takarazuka, both of Japan

[73] Assignee: Dainichi-Nippon Cables, Ltd., Amagasaki, Japan

[21] Appl. No.: 622,449

[22] Filed: Oct. 14, 1975

[30] Foreign Application Priority Data

Apr. 15, 1975  Japan .................................. 50-46260
July 31, 1975  Japan .................................. 50-93896

[51] Int. Cl.² .......................... C08F 8/26; C08G 65/24
[52] U.S. Cl. ...................................... 260/2 A; 526/17; 526/22; 526/30; 526/47
[58] Field of Search ................... 260/2 A; 526/17, 22, 526/30, 47

[56] References Cited

U.S. PATENT DOCUMENTS

| | | | |
|---|---|---|---|
| 3,310,545 | 3/1967 | Becker ................................. | 260/92.3 |
| 3,399,181 | 8/1968 | Bornemann et al. ................ | 260/92.3 |
| 3,481,912 | 12/1969 | Vanderbilt et al. ................. | 260/87.7 |
| 3,491,124 | 1/1970 | Lund et al. ........................... | 260/348 |
| 3,790,524 | 2/1974 | Saito et al. ....................... | 260/45.8 N |

*Primary Examiner*—Harold D. Anderson
*Assistant Examiner*—E. A. Nielsen
*Attorney, Agent, or Firm*—Stevens, Davis, Miller & Mosher

[57] ABSTRACT

The invention provides a curable composition of polychloroprene, chlorinated polyethylene or polyepichlorohydrin containing at least one metal oxide having an oxidation state of 2 to 5 valences as a curing agent and at least one accelerator of the formula $$A-(S)_n-A'$$

wherein S is a sulfur atom, A and A' are polyhydroxy aryl groups having 6 to 18 ring carbon atoms and $n$ is zero or an integer of 1 to 4. The accelerators enable a satisfactory rate and state of cure with the metal oxide.

7 Claims, No Drawings

CHLORINATED ELASTOMER COMPOSITIONS

BACKGROUND OF THE INVENTION

The present invention relates to a curable composition of polychloroprene, chlorinated polyethylene, or epichlorohydrin rubber, using a novel organic accelerator.

2-Mercaptoimidazoline has been widely used as an indispensable accelerator for curing polychloroprene, since it has an excellent accelerating effect and gives a tightly cured polychloroprene vulcanizate having excellent mechanical properties suitable for practical use.

The accelerating effect of 2-mercaptomidazoline is so superior that it is very important to the polychloroprene rubber industry. This is evident from the huge amount (4,000 tons or more per year in 1970) of 2-mercaptoimidazoline consumed all over the world.

However, it has been recently pointed out that 2-mercaptoimidazoline generates gaseous hydrogen cyanide in the course of the heat-treatment or the thermal curing process of polychloroprene composition.

This toxicity of 2-mercaptoimidazoline such as the formation of hydrogen cyanide brought about a trend to stop the manufacturing of this chemical by some major manufacturers, and the usage thereof was strictly restricted in several countries. A tendency to avoid 2-mercaptoimidazoline has become remarkable in the last few years.

This movement has caused a crisis in the polychloroprene industry because of the shortage of supply of this chemical, and the development of a new accelerator which is able to take the place of 2-mercaptoimidazoline has become an urgent problem.

To those skilled in the art, the development of newer accelerator for halogenated elastomers is extremely difficult. This is the reason why the curing mechanism of the elastomers is still entirely unknown and, furthermore, so complicated that the curing mechanism is peculiar to each halogenated elastomer. Since each individual curing system is so complicated and each halogenated elastomer behaves differently, most curing systems for chlorinated elastomer have not been applicable to fluorinated or brominated elastomers, and vice versa.

This failure of one curing system not being adaptable for use with different halogenated elastomers also extends to some compositions using the same halogenated elastomer but of a different grade. For example, triallylisocyanurate which is used as an accelerator for chlorinated polyethylene containing 30% by weight of Cl does not act as a useful accelerator for another chlorinated polyethylene containing less than 10% by weight of Cl. Such circumstances imply that it would be impossible to develop a novel curing chemical from the prior art.

This is the very reason why a novel curing chemical for halogenated elastomers has never been developed through analogical approach.

Investigation of the present inventors have overcome the above situation to develop a novel accelerating system which surprisingly displays an excellent accelerating effect for curing of polychloroprene and chlorinated polyethylene as well as an epichlorohydrin elastomer which is comparable with or superior to 2-mercaptoimidazoline and, as a very important advantage, which does not form any toxic gases.

SUMMARY OF THE INVENTION

The present invention provides a novel chlorinated elastomer composition which can be cured at a high performance rate without generating a toxic gas to give excellent rubber vulcanizates. This composition contains at least (A) a chlorinated elastomer selected from polychloroprene, chlorinated polyethylene and polyepichlorohydrin, (B) a metal oxide having an oxidation state of 2 to 5 valences as a curing agent, and (C) an organic acceletator having the following formula

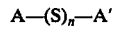

wherein S is a sulfur atom, A and A' are polyhydroxy aryl groups having 6 to 18 carbon atoms, and $n$ is zero or an integer of 1 to 4. As the accelerator, a reaction product of a polyhydroxy aromatic compound and sulfur monochloride, which is a mixture of various compounds represented by the above formula, is preferably employed. The curing system of the present invention, which is a combination of the components B and C, is applicable to polychloroprene, chlorinated polyethylene and polyepichlorohydrin.

DETAILED DESCRIPTION OF THE INVENTION

The present inventors have found that effective and satisfactory cross-linking of the chlorinated elastomers with the metal oxide curing agent can be attained by using the component C as an accelerator. The curing system of the invention is very useful for obtaining a well-cured polychloroprene rubber, chlorinated polyethylene or epichlorohydrin rubber, though it is virtually unsatisfactory for curing other halogenated elastomers. An essential feature of the present invention is the use of the component C as an accelerator in cross-linking polychloroprene, chlorinated polyethylene or polyepichlorohydrin with the metal oxide as a curing agent.

As shown by the formula:

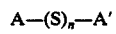

the accelerator employed in the invention has the chemical structure which includes two polyhydroxy aryl groups A and A' which are combined directly when $n=0$ or connected through the sulfur linkage when $N=1$ to 4. The polyhydroxy aryl groups A and A' can be the same one different from each other. When $n$ is not less than 5, the accelerating effect is remarkably reduced and, therefore, it is important that $n$ is selected from 0 to 4. Preferably $n$ is selected from 1 to 4, more preferably 1 to 2, and most preferably $n$ is 1. It is allowable to use a mixture of various compounds represented by the above formula. In that case, mixtures containing a higher content (more than 60% by weight) of the compounds in which $n$ is 1 to 2 are preferred. According to the present invention, it is essential that the accelerator has the above structure and has at least two phenolic —OH groups in each of the aryl groups A and A'. For instance, when a polyhydroxybenzene, polyhydroxynaphthalene or polyhydroxyanthracene is employed as an accelerator, it is difficult to obtain satisfactory curing since their accelerating effect is insufficient.

The groups A and A' in the formula are groups derived from polyhydroxy derivatives of aromatic compounds having 6 to 18 ring carbon atoms, for instance, monocyclic aromatic compounds such as benzene, biphenyl and terphenyl, fused ring aromatic compounds such as naphthalene, anthracene, phenanthrene and naphthacene. Typical examples of the polyhydroxy aryl groups A and A' are polyhydroxy phenyl groups, polyhydroxy naphthyl groups, polyhydroxy anthryl groups, polyhydroxy phenanthryl groups, polyhydroxy biphenylyl groups, polyhydroxy terphenylyl groups, polyhydroxy tetracenyl groups, polyhydroxy chrysenyl groups, polyhydroxy phenylnaphthyl groups, and the like.

Each of the aryl groups A and A' must contain at least two phenolic —OH groups, but the —OH groups can be attached at any position of each ring. Therefore, when the aryl group has a ring structure formed by one aromatic ring such as benzene, naphthalene and anthracene, at least two —OH groups can be attached at any position on the aromatic ring. Also when the aryl group has a ring structure formed by at least two aromatic rings such as biphenyl and phenylnaphthalene, either of the two rings can contain at least two —OH groups at any position or each of the two rings can contain at least one —OH group at any position. When the polyhydroxy aryl groups A or A' are polyhydroxy phenyl groups, 2 to 4 —OH groups can be present and di- and tri-hydroxy substituted phenyl groups are preferable. When the aryl group A or A' are groups other than the polyhydroxy phenyl groups, 2 to 11 —OH groups can be present and di- to penta-hydroxy substituted aryl groups are preferable. For instance, when the aryl group is naphthacenyl group, at most 11 —OH groups can be present. The polyhydroxy aryl groups A and A' may be those substituted by one or more substituents other than hydroxy group, for instance, amino group, carboxyl group, halogens, and organic groups having 1 to 8 carbon atoms such as an alkyl group, an alkenyl group, an alkoxyl group, a carboalkoxyl group or carboxylic acid amide.

Suitable examples of the accelerator employed in the present invention are 2,2',4,4'-tetrahydroxybiphenyl, 2,2',4,4'-tetrahydroxydiphenyl sulfide, 2,2',5,5'-tetrahydroxydiphenyl sulfide, 3,3',4,4'-tetrahydroxydiphenyl sulfide, 2,2',4,4'-tetrahydroxy-3,3'-dicarboxydiphenyl sulfide, 2,2',5,5'-tetrahydroxydiphenyl disulfide, 3,3',4,4'-tetrahydroxydiphenyl disulfide, 2,2',3,3'-tetrahydroxydinaphthyl sulfide, 2,4-dihydroxyphenyl-2,3-dihydroxynaphthyl sulfide, 2,2',4,5'-tetrahydroxydiphenyl sulfide, 2,2',4,4',5,5'-hexahydroxydiphenyl sulfide, 2,2',4,4',5,5'-hexahydroxydiphenyl disulfide, and the like. Thses accelerators can be employed alone or as mixtures thereof.

Usually, the accelerators having the formula A—(S)$_n$—A' (wherein S, A, A' and n are as defined above) are prepared as follows: (1) The accelerators having the formula A—A' (in the case of $n=0$) are prepared by subjecting two molecules of a polyhydroxy aromatic compound to dimerization in the presence of a catalyst such as ferric chloride or manganic tris(acetylacetonate) in a known manner. (2) The accelerators having the formula A—(S)$_n$—A' are prepared by reacting the polyhydroxy aromatic compound with sulfur chloride. The reaction of the polyhydroxy aromatic compound with sulfur dichloride (SCl$_2$) yields the accelerators having the formula A—S—A' (in the case of $n=1$). The reaction of the polyhydroxy aromatic compound with sulfur monochloride (S$_2$Cl$_2$) yields a mixture of the compounds represented by the formula A—(S)$_{0-4}$—A'. From this reaction product, the accelerators having the formula A—(S)$_{2-4}$—A' can be isolated in such a manner as by alumina column chromatography.

In the present invention the most preferable accelerator is the reaction product which can be prepared by reacting the polyhydroxy aromatic compound with sulfur monochloride.

As the polyhydroxy aromatic compound employed in the preparation of the accelerator, there can be employed polyhydroxy derivatives of aromatic compounds having 6 to 18 ring carbon atoms, for instance, monocyclic aromatic compounds such as benzene, biphenyl and terphenyl, fused ring aromatic compounds such as naphthalene, anthracene, phenanthrene and naphthacene. The polyhydroxy aromatic compound must contain at least two phenolic —OH groups, although the —OH groups may be attached in any position of the aromatic ring(s). Therefore, when the polyhydroxy aromatic compound has a ring structure formed by one aromatic ring such as benzene, naphthalene and anthracene, at least two —OH groups can be attached in any position of the aromatic ring. Also when the polyhydroxy aromatic compound has a ring structure formed by at least two aromatic rings, such as biphenyl and phenylnaphthalene, either of the two rings can contain at least two —OH groups at any position or each of the two rings can contain at least one —OH group at any position. When the polyhydroxy aromatic compound is polyhydroxy benzene, 2 to 4 —OH groups can be present and di- and tri-hydroxy substituted benzenes are preferable. When the polyhydroxy aromatic compound is one other than the polyhydroxy benzene, 2 to 11 —OH groups can be present and di- to penta-hydroxy substituted compounds are preferable. The polyhydroxy aromatic compound may be those substituted by one or more substituents other than hydroxy group, for instance, an amino group, carboxyl group, halogens and organic groups having 1 to 8 carbon atoms such as an alkyl group, an alkenyl group, an alkoxyl group, a carboalkoxyl group or carboxylic acid amide.

Typical examples of the polyhydroxy aromatic compound are resorcinol, catechol, hydroquinone, pyrogallol, phloroglucinol, 2,3-dihydroxynaphthalene, 2,7-dihydroxynaphthalene, 1,4-dihydroxynaphthalene, 1,5-dihydroxynaphthalene, 2-t-butylhydroquinone, 5-methylresorcinol, 2-methylhydroquinone, 2,5-dimethylhydroquinone, 2,6-dihydroxybenzoic acid, 2,6-dihydroxybenzoic acid ethanolamide, 2,6-dihydroxymethyl benzoate, 3,5-dihydroxy-1-methoxybenzene, 2,6-dihydroxy-1-dimethylaminobenzene, 3,5-dihydroxy-1-isopropylbenzene, 2,6-dihydroxy-1-propenylbenzene, 1,4-dihydroxyanthracene, 1,4,5,8-tetrahydroxyanthracene, 1,4,9,10-tetrahydroxyanthracene, 2,3-dihydroxyphenanthrene, 1,3-dihydroxybiphenyl, 1,3,3'-trihydroxy-p-terphenyl, 1,2',3-trihydroxy-m-terphenyl, 2,3-dihydroxytetracene, 2,3-dihydroxychrysene, 2,3-dihydroxy-5-phenylnaphthalene, and the like. Preferable polyhydroxy aromatic compounds are resorcinol, catechol, hydroquinone, pyrogallol, phloroglucinol, 2,3-dihydroxynaphthalene, 2,6-dihydroxybenzoic acid and 2,6-dihydroxybenzoic acid ethanolamide. In the preparation of the accelerator, the polyhydroxy aromatic compounds may be employed alone or in a mixture thereof.

The reaction of the polyhydroxy aromatic compound and sulfur monochloride is carried out in the absence of or preferably in the presence of an organic solvent at a temperature of −10° to 100° C., preferably 0° to 50° C. for 1 to 12 hours with agitation. The amount of polyhydroxy aromatic compound is selected from 1.5 to 4 moles, preferably 2 to 3 moles per mole of sulfur monochloride. The end point of the reaction is the point where the yield of the product reaches the maximum, and this point can be judged by monitoring by thin-layer chromatography on silica-gel. As the organic solvent, anhydrous organic solvents capable of dissolving both the polyhydroxy aromatic compound and the sulfur monochloride are employed. Examples of the organic solvent are acetone, diethyl ether, ethyl acetate, butyl acetate, acetonitrile, methanol and ethanol. The amount of the organic solvent usually employed in solvent reactions suffices. Generally, 100 to 10,000 ml. of the organic solvent per mole of sulfur monochloride is employed. After the completion of the reaction, the organic solvent is evaporated in vacuo to give the reaction product. The reaction product so prepared is purified in the usual manner, and employed as the accelerator. The crude product which is merely washed with water and dried can also be employed as the accelerator in any form (powder, solid or sirup) without further purification. The thus obtained reaction product of the polyhydroxy aromatic compound with sulfur monochloride is the mixture of the compounds represented by the formula A—$(S)_{0-4}$—A'.

The accelerator in the present invention is employed in an amount of 0.1 to 10 parts by weight, preferably 0.5 to 5 parts by weight, per 100 parts by weight of the chlorinated elastomer.

As the curing agent, oxides of metals of Groups II, IV, V, VI and VIII of the Periodic Table are employed. These metal oxides have an oxidation state of from 2 to 5 valences. The metal oxides are employed alone or in a mixture thereof. Examples of the metal oxide employed in the present invention are BeO, MgO, ZnO, CaO, GeO, TiO, $TiO_2$, $Ti_2O_3$, $Ti_3O_5$, SnO, $SnO_2$, PbO, $Pb_3O_4$, $PbO_2$, $Sb_2O_3$, $Sb_2O_5$, $V_2O_5$, $CrO_2$, $MoO_2$, $WO_2$, $Fe_2O_3$, FeO, $Fe_3O_4$, CoO, $Co_2O_3$ and NiO. Preferred metal oxides are MgO, ZnO, CaO, $TiO_2$, PbO, $PbO_2$, $Pb_3O_4$, $Sb_2O_3$ and $Fe_2O_3$. The amount of the metal oxide employed generally is 3 to 30 parts by weight, preferably 5 to 15 parts by weight, per 100 parts by weight of the chlorinated elastomer.

According to the present invention, when the accelerator represented by the formula A—$(S)_n$—A' ($n$ is 2, 3 or 4) or the reaction product of the aromatic compound with sulfur monochloride is employed, the curing of the chlorinated elastomer compositions can be further accelerated by including one or more of the polyhydroxy aromatic compounds mentioned before as the starting material for preparing the accelerator, in an amount of 0.1 to 5 parts by weight, preferably 0.3 to 2 parts by weight, per 100 parts by weight of the chlorinated elastomer.

In the present invention, all the commercially available polycholoprenes, chlorinated polyethylenes and chlorohydrin rubbers are employed. Preferable examples are polychloroprene having $ML_{1+4}$ 20 to 60, chlorinated polyethylene containing 20 to 60% by weight of chlorine and homopolymerized epichlorohydrin rubber.

In the compositions, other additives may be present, including reinforcing agents such as carbon black, mineral fillers such as clay, talc, calcium carbonate or silicates, stabilizing agents, antioxidants, processing oils and waxes.

The chlorinated elastomer compositions of the invention are prepared by a known process, for instance, by uniformly blending the desired amount of the components of the curing system with the chlorinated elastomer by means of a conventional rubber mixing apparatus such as a roll mill or Banbury mixer.

Although the composition of the present invention can be cured under the conventional curing conditions used for chlorinated elastomers (at 80° to 230° C.), the composition is preferably cured in accordance with the invention at a temperature of 100° to 210° C. for 2 to 120 minutes to obtain a completely cured vulcanizate. A press cure under a pressure of 3 to 150 kg./cm² may also be conducted.

The present invention is more specifically described and explained by means of the following Examples, in which all parts are by weight.

REFERENCE EXAMPLES

Preparation of the accelerator:

[Preparation 1]

In 200 parts of diethyl ether, 36 parts of 1,3-dihydroxybiphenyl was dissolved. To the resulting solution, a solution of 17 parts of sulfur monochloride dissolved in 100 parts of diethyl ether was added dropwise with vigorous agitation at a room temperature for 1 to 2 hours. the exothermic reaction of 1,3-dihydroxybiphenyl with sulfur monochloride immediately occurred, and the reaction mixture was tinged with red by the addition of sulfur monochloride solution. After the completion of the addition, the agitation was further continued for 12 hours to give an ether solution of the reaction product tinged with yellowish brown. The ether solution was washed with 500 ml. of water 5 times. After drying with $Na_2SO_4$, the ether was evaporated under a reduced pressure to give a crude reaction product. The crude reaction product was fractionated by column chromatography on alumina ($Al_2O_3$) to isolate bis[1-(1',3'-dihydroxydiphenyl)] trisulfide (hereinafter referred to as "GP-1") and bis[1-(1',3'-dihydroxydiphenyl)] tetrasulfide (hereinafter referred to as "GP-2").

[Preparation 2]

The same procedure as in Preparation 1 were repeated except that 27 parts of resorcinol was employed instead of 36 parts of 1,3-dihydroxybiphenyl to give a crude reaction product which was pale yellow sirup. The crude reaction product was then dried under a reduced pressure of $10^{-1}$ mmHg at room temperature over night, and a yellow powder was obtained (hereinafter referred to as "GP-3").

[Preparation 3]

The same procedure as in Preparation 2 was repeated except that catechol was employed instead of resorcinol and also acetonitrile was employed as a solvent instead of diethyl ether to give a yellowish brown sirup reaction product (hereinafter referred to as "GP-4").

[Preparation 4]

The same procedure as in Preparation 2 was repeated except that hydroquinone was employed instead of resorcinol to give a light yellow powder (hereinafter referred to as "GP-5").

[Preparation 5]

The same procedure as in Preparation 2 was repeated except that each of the following polyhydroxy aromatic compound was employed instead of 27 parts of resorcinol to give an accelerator.

| Polyhydroxy aromatic compound | Amount (parts) | State of the product | Name |
|---|---|---|---|
| Pyrogallol | 31 | brown sirup | GP-6 |
| Phloroglucinol | 31 | brown sirup | GP-7 |
| 2,3-Dihydroxynaphthalene | 39 | reddish brown sirup | GP-8 |
| 2,6-Dihydroxybenzoic acid ethanolamide | 39 | brown sirup | GP-9 |
| 2,6-Dihydroxybenzoic acid | 48 | yellowish brown sirup | GP-10 |

EXAMPLES 1 TO 20 AND COMPARATIVE EXAMPLES 1 TO 4

Employing polychloroprene (commercially available under the registered trademark "NEOPRENE W" made by Showa Neoprene, Co.) as the chlorinated elastomer, a master batch indicated by the following base formulation was mixed for 10 minutes in a Banbury mixer (Type B). To this master batch, individual rubber compositions were prepared by adding each amount of the accelerator, a metal oxide as a curing agent with or without a polyhydroxy aromatic compound (per 100 parts of polychloroprene) shown in Table 1 on a laboratory mill for 10 minutes at room temperature.

| Base Formulation | |
|---|---|
| Ingredient | Parts |
| Polychloroprene | 100 |
| Dixie clay (R.T. Vanderbilt, Co., Inc.,) | 60 |
| Carbon Black (FEF: Hokutan Carbon, Co.) | 25 |
| Processing oil (SONIC R-1000; sp. gr. 0.93; viscosity 20 cSt; Nippon Kogyo Ltd.) | 10 |
| Stearic acid | 1 |
| Phenyl-$\beta$-naphthylamine | 3 |

To estimate the curing behavior of the obtained rubber compositions, rheometer torque values after 5 and 20 minutes and maximum torque of each composition were measured by using an Oscillating Disk Rheometer (ODR manufactured by Toyoseiki Seisakusho, Ltd.) with a disk sample of 30 mm. in diameter at a temperature of 150° C. Also each composition was press-cured at a temperature of 150° C. and a pressure of 100 kg./cm.² for 45 minutes to give the corresponding valcanizate, and mechanical properties of the obtained cured rubber were measured.

Modulus at 200% elongation, tensile strength and elongation were measured by using dumbbell test pieces (No. 3) prepared from the cured sheet having a thickness of 2 mm. according to the provision of Japanese Industrial Standard K 6301. The hardness was determined as Shore A hardness measured with a hardness tester (Hokusin Type Hardness-Meter made by Hokusin Chemical Ind., Co.).

The resutls are shown in Table 1.

Table 1

| Ingredient | Com. Ex. 1 | Com. Ex. 2 | Com. Ex. 3 | Com. Ex. 4 | Ex. 1 |
|---|---|---|---|---|---|
| Accelerator (parts) | — | — | — | 2-mercaptoimidazoline (1.0) | 2,2',4,4'-tetrahydroxybiphenyl (1.0) |
| Curing agent (parts) | — | ZnO (5) MgO (5) | ZnO (5) MgO (4) | ZnO (5) MgO (4) | ZnO (5) MgO (4) |
| Polyhydroxy aromatic compound (parts) | — | — | pyrogallol (0.5) | — | — |
| Curing characteristic | | | | | |
| Torque (kg.-cm.) $T_5$ | 5 | 4 | 5 | 26 | 10 |
| $T_{20}$ | 5.5 | 8 | 9 | 56 | 29 |
| $T_{max}$ | 6.5 | 11 | 12 | 67 | 39 |
| Mechanical properties | | | | | |
| Modulus at 200 % elongation (kg./mm.²) | 0.18 | 0.16 | 0.16 | 1.25 | 0.60 |
| Tensile Strength (kg./mm.²) | 0.32 | 0.40 | 0.41 | 1.77 | 1.41 |
| Elongation (%) | 500 | 480 | 510 | 330 | 583 |
| Hardness | 53 | 52 | 53 | 63 | 60 |

| Ingredient | Ex. 2 | Ex. 3 | Ex. 4 |
|---|---|---|---|
| Accelerator (parts) | 3,3',4,4'-tetrahydroxybiphenyl (1.0) | 2,2',4,4'-tetrahydroxydiphenyl sulfide (1.0) | 2,2',5,5'-tetrahydroxydiphenyl sulfide (1.5) |
| Curing agent (parts) | ZnO (4) MgO (4) | ZnO (5) MgO (4) | ZnO (6) TiO$_2$ (5) |
| Polyhydroxy aromatic compound (parts) | — | — | — |
| Curing characteristic | | | |
| Torque (kg.-cm.) $T_5$ | 10 | 12 | 6 |
| $T_{20}$ | 30 | 40 | 12 |
| $T_{max}$ | 39 | 51 | 22 |
| Mechanical properties | | | |
| Modulus at 200 % elongation (kg./mm.²) | 0.61 | 0.74 | 0.42 |
| Tensile strength (kg./mm.²) | 1.38 | 1.76 | 1.23 |
| Elongation (%) | 580 | 493 | 592 |
| Hardness | 60 | 59 | 55 |

| Ingredient | Ex. 5 | Ex. 6 | Ex. 7 |
|---|---|---|---|
| Accelerator (parts) | 2,2',4,4',5,5'-hexahydroxydiphenyl sulfide (1.0) | 2,2',4,4'-tetrahydroxy-3,3'-dicarboxydiphenyl sulfide (1.0) | 2,2',3,3'-tetrahydroxydinaphthyl sulfide (1.0) |
| Curing agent (parts) | ZnO (5) Sb$_2$O$_3$ (5) | ZnO (5) Pb$_2$O$_3$ (6) | ZnO (6) PbO (6) |
| Polyhydroxy aromatic compound (parts) | — | — | — |
| Curing characteristic | | | |
| Torque (kg.-cm.) $T_5$ | 10 | 10 | 22 |

Table 1-continued

|  | | | |
|---|---|---|---|
| $T_{20}$ | 39 | 28 | 36 |
| $T_{max}$ | 48 | 39 | 50 |
| Mechanical Properties | | | |
| Modulus at 200 % elongation (kg./mm.$^2$) | 0.87 | 0.70 | 0.63 |
| Tensile strength (kg./mm.$^2$) | 1.65 | 1.56 | 1.47 |
| Elongation (%) | 518 | 442 | 456 |
| Hardness | 59 | 61 | 59 |

| | Ex. 8 | Ex. 9 | Ex. 10 |
|---|---|---|---|
| Ingredient | | | |
| Accelerator (parts) | 3,3'-4,4'-tetrahydroxy-diphenyl sulfide (1.0) | 2,2',5,5'-tetrahydroxy-diphenyl disulfide (1.5) | 3,3',4,4'-tetrahydroxy-diphenyl disulfide (1.5) |
| Curing agent (parts) | TiO$_2$(5) Fe$_2$O$_3$(6) | ZnO (4) Pb$_3$O$_4$ (8) | ZnO (5) MgO (4) |
| Polyhydroxy aromatic compound (parts) | — | — | hydroquinone (0.5) |
| Curing characteristic | | | |
| Torque (kg.-cm.) T$_5$ | 20 | 21 | 13 |
| T$_{20}$ | 38 | 39 | 36 |
| T$_{max}$ | 46 | 48 | 41 |
| Mechanical properties | | | |
| Modulus at 200 % elongation (kg./mm.$^2$) | 0.58 | 0.72 | 0.61 |
| Tensile strength (kg./mm.$^2$) | 1.40 | 1.32 | 1.48 |
| Elongation (%) | 442 | 468 | 486 |
| Hardness | 62 | 61 | 60 |

| | Ex. 11 | Ex. 12 | Exc. 13 | Ex. 14 | Ex. 15 | Ex. 16 |
|---|---|---|---|---|---|---|
| Ingredient | | | | | | |
| Accelerator (parts) | GP-1 (1.5) | GP-2 (1.0) | GP-3 (1.5) | GP-4 (1.0) | GP-5 (1.5) | GP-6 (1.0) |
| Curing agent (parts) | ZnO (5) MgO (4) | ZnO (5) TiO$_2$ (5) | ZnO (5) TiO$_2$ (5) | ZnO (5) MgO (4) | ZnO (5) MgO (4) | ZnO (5) MgO (4) |
| Polyhydroxy aromatic compound (parts) | pyrogallol (0.5) | phloroglucinol (0.5) | resorcinol (0.5) | — | hydrouquinone (0.5) | 2,3-dihydroxynaphthalene (0.5) |
| Curing characteristic | | | | | | |
| Torque (kg.-cm.) T$_5$ | 29 | 17 | 18 | 11 | 7 | 29 |
| T$_{20}$ | 36 | 23 | 38 | 29 | 21 | 45 |
| T$_{max}$ | 52 | 46 | 41 | 39 | 49 | 52 |
| Mechanical properties | | | | | | |
| Modulus at 200 % elongation (kg./mm.$^2$) | 0.84 | 0.90 | 0.75 | 0.60 | 0.86 | 0.83 |
| Tensile strength (kg./mm.$^2$) | 1.37 | 1.34 | 1.34 | 1.55 | 1.61 | 1.76 |
| Elongation (%) | 390 | 360 | 527 | 583 | 443 | 500 |
| Hardness | 66 | 68 | 61 | 62 | 61 | 61 |

| | Ex. 17 | Ex. 18 | Ex. 19 | Ex. 20 |
|---|---|---|---|---|
| Ingredient | | | | |
| Accelerator (parts) | GP-7 (1.0) | GP-8 (2.0) | GP-9 (2.0) | GP-10 (2.0) |
| Curing agent (parts) | CaO (3) TiO$_2$ (6) | CaO (2) MgO (4) | ZnO (5) MgO (4) | ZnO (5) |
| MgO (5) | | | | |
| Polyhydroxy aromatic compound (parts) | 2,6-dihydroxybenzoic acid (0.5) | 2,6-dihydroxybenzoic acid ethanolamine (0.5) | catechol (0.5) | pyrogallol (0.2) |
| Curing characteristic | | | | |
| Torque (kg.-cm.) T$_5$ | 26 | 24 | 18 | 15 |
| T$_{20}$ | 46 | 44 | 38 | 36 |
| T$_{max}$ | 56 | 50 | 44 | 42 |
| Mechanical properties | | | | |
| Modulus at 200 % elongation (kg./mm.$^2$) | 0.90 | 0.76 | 0.71 | 0.65 |
| Tensile strength (kg./mm.$^2$) | 1.80 | 1.68 | 1.56 | 1.62 |
| Elongation (%) | 405 | 475 | 550 | 496 |
| Hardness | 62 | 61 | 60 | 61 |

EXAMPLES 21 TO 26

Similar experiment as in Examples 1 to 20 was repeated except that Neoprene GRT (manufactured by Showa Neoprene, Co.) was employed as the chlorinated elastomer instead of Neoprene W, and individual rubber compositions were prepared by adding each amount of additives shown in Table 2.

The results of curing characteristic and mechanical properties are shown in Table 2.

Table 2

| | Ex. 21 | Ex. 22 | Ex. 23 | Ex. 24 | Ex. 25 |
|---|---|---|---|---|---|
| Ingredient | | | | | |
| Accelerator (parts) | 2,2',4,4'-tetra-hydroxybiphenyl (1.0) | 2,2',4,4'-tetra-hydroxydiphenyl sulfide (1.0) | 2,2',5,5'-tetra-hydroxydiphenyl sulfide (1.5) | GP-4 (1.5) | GP-5 (1.5) |
| Curing agent (parts) | ZnO (5) MgO (4) | ZnO (5) TiO$_2$ (5) | ZnO (5) Pb$_2$O$_3$ (6) | ZnO (5) CaO (3) | Zno (5) MgO (4) |
| Curing characteristic | | | | | |
| Torque (kg.-cm.) T$_5$ | 20 | 16 | 22 | 20 | 18 |
| T$_{20}$ | 65 | 62 | 66 | 62 | 66 |
| T$_{max}$ | 70 | 72 | 71 | 68 | 71 |
| Mechanical properties | | | | | |
| Modulus at 200 % elongation (kg./mm.$^2$) | 1.12 | 0.96 | 0.92 | 0.92 | 0.94 |
| Tensile strength (kg./mm.$^2$) | 1.98 | 1.88 | 1.94 | 1.82 | 1.92 |
| Elongation (%) | 380 | 390 | 370 | 380 | 390 |
| Hardness | 61 | 62 | 61 | 60 | 61 |

EXAMPLES 26 TO 33 AND COMPARATIVE EXAMPLES 5 and 6

Employing chlorinated polyethylene having a chlorine content of 30% by weight (manufactured by Showa Denko Kabushiki Kaisha) as the chlorinated elastomer, compositions were prepared by adding each amount of the accelerator, a metal oxide as a curing agent with or without a polyhydroxy aromatic compound (per 100 parts of chlorinated polyethylene) shown in Table 3 to the following base formulation, and then milling the resulting mixture by means of mixing rolls at a temperature of 90° C.

| Base Formulation | |
|---|---|
| Ingredient | Parts |
| Chlorinated polyethylene | 100 |
| Precipitated calcium carbonate | 50 |
| Tribasic lead sulfate | 10 |
| Carbon black (FEF: Hokutan Carbon, Co.) | 20 |
| Dibasic lead stearate | 2 |
| Epoxidized soybean oil | 4 |

To estimate the curing characteristic of the obtained compositions, torque values after 5 and 20 minutes and maximum torque of each composition were measured by using an oscillating disc rheometer at a temperature of 150° C. Also each composition was press-cured at a temperature of 165° C. and pressure of 100 kg./cm.² for 30 minutes to give cured rubber in a form of sheet, and the mechanical properties of the obtained cured rubber were measured by using the sheet having a thickness of 1 mm.

The results are shown in Table 3.

Table 3

| | Com. Ex. 5 | Com. Ex. 6 | Ex. 26 | Ex. 27 | Ex. 28 |
|---|---|---|---|---|---|
| Ingredient | | | | | |
| Accelerator (parts) | — | — | 2,2',4,4'-tetra-hydroxybiphenyl (1.5) | 2,2',4,4'-tetra-hydroxydiphenyl sulfide (1.0) | 2,2',4,4',5,5'-hexahydroxydiphenyl sulfide (1.5) |
| Curing agent (parts) | — | MgO (10) PbO (5) | MgO (10) TiO$_2$ (5) | MgO (10) Pb$_3$O$_4$ (6) | PbO (6) MgO (10) |
| Polyhydroxy aromatic compound (parts) | — | — | — | — | — |
| Curing chracteristic | | | | | |
| Torque (kg.-cm.) T$_5$ | 5 | 5 | 11 | 15 | 14 |
| T$_{20}$ | 12 | 13 | 23 | 26 | 23 |
| T$_{max}$ | 13 | 16 | 38 | 42 | 36 |
| Mechanical properties | | | | | |
| Modulus at 200 % elongation (kg./mm.²) | 0.10 | 0.11 | 0.17 | 0.16 | 0.18 |
| Tensile strength (kg./mm.²) | 1.10 | 1.46 | 1.86 | 1.92 | 1.80 |
| Elongation (%) | 635 | 620 | 560 | 570 | 570 |

| | Ex. 29 | Ex. 30 | Ex. 31 | Ex. 32 | Ex. 33 |
|---|---|---|---|---|---|
| Ingredient | | | | | |
| Accelerator (parts) | 2,2',5,5'-tetra-hydroxydiphenyl disulfide (1.0) | 2,2',3,3'-tetra-hydroxydinaphthyl sulfide (1.5) | GP-3 (1.0) | GP-4 (1.5) | GP-6 (1.5) |
| Curing agent (parts) | CaO (3) MgO (10) TiO$_2$ (5) | ZnO (5) MgO (10) Sb$_2$O$_3$ (6) | ZnO (5) MgO (10) Pb$_2$O$_3$ (5) | ZnO (5) MgO (10) Sb$_2$O$_3$ (5) | ZnO (5) MgO (10) TiO$_2$ (5) |
| Polyhydroxy aromatic compound (parts) | — | — | resorcinol (0.5) | 2,3-dihydroxy-naphthalene (0.5) | hydroquinone (0.5) |
| Curing characteristic | | | | | |
| Torque (kg.-cm.) T$_5$ | 12 | 11 | 14 | 15 | 11 |
| T$_{20}$ | 24 | 23 | 31 | 35 | 30 |
| T$_{max}$ | 33 | 35 | 40 | 44 | 41 |
| Mechanical properties | | | | | |
| Modulus at 200 % elongation (kg./mm.²) | 0.20 | 0.15 | 0.18 | 0.19 | 0.15 |
| Tensile strength (kg./mm.²) | 1.76 | 1.72 | 1.86 | 1.89 | 1.90 |
| Elongation (%) | 560 | 530 | 530 | 510 | 560 |

EXAMPLES 34 to 39 and Comparative Example 7

Employing epichlorohydrin rubber (commercially available under the registered trademark "HYDRIN 100" made by The B. F. Goodrich Co.), compositions were prepared by adding each amount of the accelerator, a metal oxide as a curing agent with or without a polyhydroxy aromatic compound (per 100 parts of epichlorohydrin rubber) shown in Table 4 to the following base formulation, and then milling the resulting mixture by means of mixing rolls at a room temperature.

| Base Formulation | |
|---|---|
| Ingredient | Parts |
| Epichlorohydrin rubber | 100 |
| Carbon black | 50 |
| Lead stearate | 2 |
| Nickel butyldithiocarbamate | 1 |

Torque values and mechanical properties were measured in the same manner as in Examples 1 to 20.

The results are shown in Table 4.

Table 4

| | Com. Ex. 7 | Ex. 34 | Ex. 35 |
|---|---|---|---|
| Ingredient | | | |
| Accelerator (parts) | — | 2,2',4,4'-tetrahydroxy-diphenyl sulfide (2.5) | 2,2',4,4',5,5'-hexahydroxy-diphenyl sulfide (2.5) |
| Curing agent (parts) | ZnO (5) MgO (5) | ZnO (5) MgO (5) | ZnO (5) CaO (3) |
| Polyhydroxy aromatic compound (parts) | — | — | — |
| Curing characteristic | | | |

Table 4-continued

| | | | | |
|---|---|---|---|---|
| Torque (kg.-cm.) $T_5$ | | 4.5 | 15 | 16 |
| $T_{20}$ | 5.0 | 21 | 22 | |
| $T_{max}$ | 6.5 | 30 | 33 | |
| Mechanical properties | | | | |
| Modulus at 200 % elongation (kg./mm.$^2$) | 0.20 | 0.68 | 0.54 | |
| Tensile strength (kg./mm.$^2$) | 0.29 | 1.35 | 0.99 | |
| Elongation (%) | 520 | 530 | 498 | |
| Hardness | 62 | 64 | 63 | |

| | Ex. 36 | Ex. 37 | Ex. 38 | Ex. 39 |
|---|---|---|---|---|
| Ingredient | | | | |
| Accelerator (parts) | GP-4 (1.5) | GP-6 (2.0) | GP-7 (3.0) | GP-8 (3.0) |
| Curing agent (parts) | ZnO (5) | ZnO (5) | ZnO (5) | CaO (4) |
| | Sb$_2$O$_3$ (3) | MgO (5) | MgO (5) | Fe$_2$O$_3$ (6) |
| Polyhydroxy aromatic compound (parts) | 2,3-dihydroxy-naphthalene (0.5) | catechol (0.5) | phloroglucinol | resorcinol (0.5) |
| Curing characteristic | | | | |
| Torque (kg.-cm.) $T_5$ | 19 | 18 | 15 | 16 |
| $T_{20}$ | 27 | 26 | 20 | 23 |
| $T_{max}$ | 36 | 35 | 27 | 34 |
| Mechanical properties | | | | |
| Modulus at 200 % elongation (kg./mm.$^2$) | 1.26 | 1.42 | 1.20 | 1.45 |
| Elongation (%) | 510 | 520 | 480 | 500 |
| Hardness | 62 | 62 | 60 | 63 |

What we claim is:

1. A chlorinated elastomer composition comprising
   a. a chlorinated elastomer selected from the group consisting of polychloroprene, chlorinated polyethylene and polyepichlorohydrin,
   b. 3 to 30 parts of at least one metal oxide of Groups II, IV, V, VI, and VIII of the Periodic Table, wherein the metal has an oxidation state of 2 to 5 valences as a curing agent, and
   c. 0.1 to 10 parts of at least one accelerator having the general formula:

$$A-(S)_n-A'$$

wherein S is sulfur atom, A and A' are polyhydroxy aryl groups having 6 to 18 ring carbon atoms and n is zero or an integer of 1 to 4, said parts of (b) and (c) being parts by weight per 100 parts of (a).

2. The composition of claim 1, wherein said n in the formula is an integer of 1 to 4.

3. The composition of claim 2, in which the composition contains 0.1 to 5 parts by weight of a polyhydroxy aromatic compound having 6 to 18 ring carbon atoms per 100 parts by weight of the chlorinated elastomer.

4. The composition of claim 1, wherein said accelerator is present in an amount of from 0.5 to 5 parts by weight per 100 parts by weight of the chlorinated elastomer.

5. The composition of claim 1, wherein said accelerator is a reaction product of 1.5 to 4 moles of a polyhydroxy aromatic compound having 6 to 18 ring carbon atoms with one mole of sulfur monochloride at a temperature of −10° to 100° C.

6. The composition of claim 5, in which the composition contains 0.1 to 5 parts by weight of a polyhydroxy aromatic compound having 6 to 18 ring carbon atoms ring per 100 parts by weight of the chlorinated elastomer.

7. A process for curing chlorinated elastomers comprising the steps of
   1. blending (a) a chlorinated elastomer selected from the group consisting of polychloroprene, chlorinated polyethylene and polyepichlorohydrin with (b) 3 to 30 parts of at least one metal oxide of Groups II, IV, V, VI, and VIII of the Periodic Table, wherein the metal has an oxidation state of 2 to 5 valences as a curing agent and (c) 0.1 to 10 parts of at least one accelerator having the general formula:

$$A-(S)_n-A'$$

wherein S is sulfur atom, A and A' are polyhydroxy aryl groups having 6 to 18 ring carbon atoms and n is zero or an integer of 1 to 4, and
   2. curing the resulting composition at a temperature of 80° to 230° C. for 2 to 120 minutes, said parts of (b) and (c) being parts by weight per 100 parts of (a).

* * * * *